United States Patent [19]

Bronnert

[11] Patent Number: 4,850,270
[45] Date of Patent: Jul. 25, 1989

[54] LIQUID SOLID CONTINUOUS ASEPTIC PROCESSING SYSTEM

[76] Inventor: Hervé X. Bronnert, 21495 Partridge Ct., Brookfield, Wis. 53005

[21] Appl. No.: 175,854

[22] Filed: Mar. 31, 1988

[51] Int. Cl.$^4$ ............................. A23L 3/00; A23L 3/22
[52] U.S. Cl. .................................. 99/355; 15/104.062; 99/443 C; 99/470; 137/268
[58] Field of Search ................. 99/325, 330, 339, 352, 99/353, 359, 360, 443 R, 470, 443 C, 404, 405, 406; 137/268; 15/104.062, 104.061; 165/95

[56] References Cited

U.S. PATENT DOCUMENTS

| | | | |
|---|---|---|---|
| 3,086,868 | 4/1963 | Keifer | 99/443 C |
| 3,232,090 | 2/1966 | Walker | 137/268 |
| 3,562,014 | 2/1971 | Childers et al. | 15/104.062 |
| 3,731,701 | 5/1973 | Sugeno | 137/268 |
| 3,779,270 | 12/1973 | Davis | 137/268 |
| 4,181,072 | 1/1980 | Hirahara | 99/353 |
| 4,416,703 | 11/1983 | Scott | 15/104.061 |
| 4,584,932 | 4/1986 | Abma | 99/470 |

Primary Examiner—Timothy F. Simone
Attorney, Agent, or Firm—Foley & Lardner

[57] ABSTRACT

A liquid-solid continuous aseptic processing system including a pipe circuit having a constant diameter, a process liquid storage tank connected to one end of said pipe circuit, a process liquid pump for maintaining the process liquid at constant pressure, a projectile feed tube connected to the pipe circuit for feeding projectiles into said pipe circuit at spaced intervals to form process units, a product solid load assembly for introducing predetermined amounts of said particulate in each of the process units, a number of heat exchange units in the pipe circuit for processing the liquid-solid process units, and a projectile separation assembly for discharging process units from the circuit and returning the projectiles to the projectile feed tube.

16 Claims, 6 Drawing Sheets

LIQUID SOLID CONTINUOUS ASEPTIC PROCESSING SYSTEM

BACKGROUND OF THE INVENTION

1. Field of the Invention

The present invention relates to the processing of liquids and chunky particulates of fruits, vegetables or meats. More particularly, the invention relates to a continuous aseptic system for processing individual can size units of predetermined amounts of liquid and solid ingredients.

2. Description of the Prior Art

The most widely used equipment for the continuous processing of such materials under sterile conditions is the swept or scraped surface heat exchanger (SSHE). This type of exchanger uses a cylindrical barrel fitted with a rotating dasher, the blades of which bear against the internal surface of the barrel. Heating or cooling of the barrel is affected by introducing the heat exchange medium, i.e. steam, water, brine or refrigeration, into a jacket which surrounds the exterior of the barrel. The rotating motion of the blades against the internal surface of the barrel continually exposes the internal surface of the barrel to new product. Since the barrel has a comparatively small heating surface, the temperature of the heat or cold exchange medium is generally quite high or low. This high temperature differential imparts thermal shock to the product as it engages the interior wall of the barrel which generates unwanted cooked flavor to the final product. The higher temperature necessary for sterilization also renders the solid particulates very sensitive to mechanical damage from the continuous impact with the fast rotating blades resulting in a loss in the visual appeal of the solid particulates.

In order to minimize impact on the particulates, the liquid viscosity must be very high in order to prevent separation of the particulates. This is accomplished by the addition of starch which is generally disproportionate to the desired effect on the finished product due to the mechanical destruction of the starch by the quickly moving blades.

In the processing of liquid and solid particulates, it is difficult to prevent the separation of the liquid from the solid. This is further aggravated where large solid particulates are being processed which requires additional heat exchange time for the heat to reach the center of the particles often resulting in overheating of the supporting or carrying liquid.

Another system available to process and sterilize liquid solid products consists of a double cone aseptic processing vessel using both direct and indirect heating and cooling. This vessel batches solids separately from a second parallel system which continuously sterilizes the sauce. The rotating double cone vessel imparts at high temperature a tumbling action to the solids which mechanically damages them and can affect their appearance. The batching action precludes a continuous aseptic processing as a new solid load has to be introduced into the vessel breaking the vessel aseptic condition. This is a fairly expensive system since a large mass, up to one to two tons, is processed in each batch. The batch type system requires separation of the solid and liquid processing complicating the system in requiring additional aseptic vessels. Since the process is not continuous its use in commercial applications has been limited.

SUMMARY OF THE INVENTION

The present invention relates to a system which continuously and aseptically processes independent units of liquid and solid particulate materials. One of the primary features of the invention is the use of projectiles in a continuous liquid line of constant diameter which are introduced at spaced intervals to provide units of constant volume and constant composition of predetermined amounts of liquid and solid in the space between the projectiles.

Another feature of the system is the use of a constant internal diameter tubing from the start to the finish of the process. The internal circular bore provides easy travel of a free projectile type piston to maintain a constant ratio of solid to liquid in each unit.

Another feature of the invention is the introduction into the process line of solid particulates through a hydraulic pressure lock assembly. The solid particulates can be steam heated, infrared heated or microwave heated prior to introduction into the hydraulic pressure lock assembly. The hydraulic pressure lock assembly makes it possible to introduce into each unit in the process line controlled amounts of the solid particulates.

A number of advantages are provided by the system.

The separation of the solid introduction from the liquid pumping system makes it possible to use any centrifugal or positive displacement pump to provide the pressure necessary to move the liquid through the line. The pumping is easier, more efficient, more accessible and prevents any damage to the solid particulates.

Separating the heating of the liquid from the heating of the solid particulates makes it possible to control their individual time and temperature requirements to achieve thorough sterilization. This prevents overheating of the liquid and guarantees total heating of the solid.

The use of projectiles to define the units in the process line guarantees that a specific ratio of liquid to solid is maintained during the processing steps and offers the flexibility to change this ratio or adjust it when necessary. The product composition is, therefore, maintained constant and any form of liquid can be used as the fluid for the end product.

Before one embodiment of the invention is explained in detail it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE INVENTION

Figure 1A:
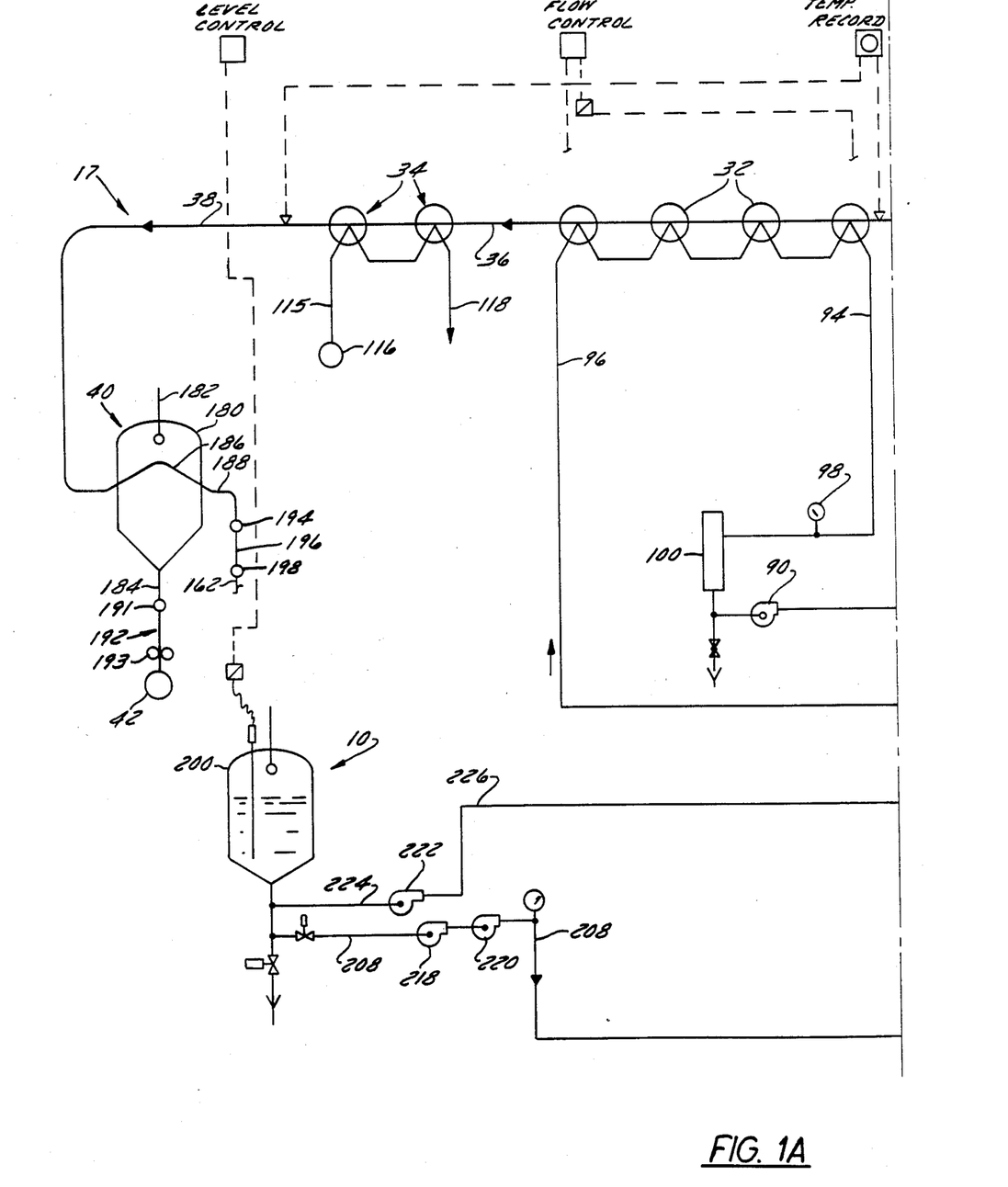
FIGS. 1A and 1B are a schematic flow diagram of the continuous aseptic processing system.
Figure 1B:
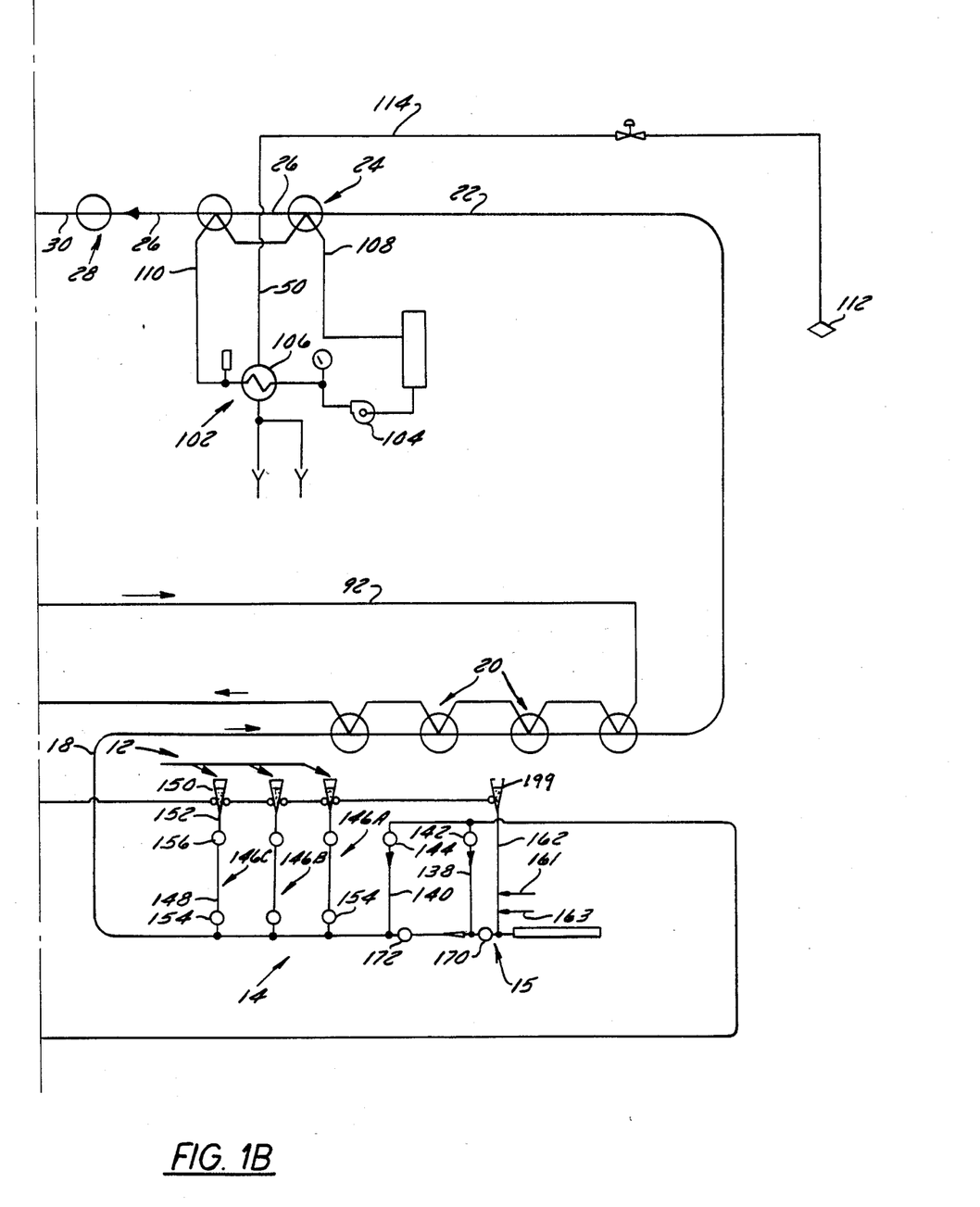

Referring to FIGS. 1A and 1B, a schematic diagram is shown of the liquid-solid continuous aseptic processing system according to the present invention wherein product liquid from a source 10 and product solid from a source 12 are fed to a unique liquid-solid particulate loading assembly 14 where the product liquid and the product solid are combined in a predetermined ratio to form liquid-solid particulate units 16 of a predetermined volume for final processing in a closed loop pipe circuit 17. Each unit 16 is formed by means of projectiles 122 which are fed by means of a projectile loading assembly 15 into a pipe 18 at equally spaced intervals. The spaces between the projectiles are initially filled with liquid and predetermined amounts of solid particulates are added by assembly 14.

The units 16 are passed through a regenerating heat assembly 20 for preliminary warm up. The heated unit 16 moves through a pipe 22 to a high temperature heat assembly 24 where the temperature of the unit 16 is raised to a predetermined temperature. The heated unit 16 is then passed through a pipe 26 to a temperature holding assembly 28 where the temperature of the unit 16 is maintained at the cooking temperature for a predetermined period of time. The unit 16 is then moved through pipe 30 to a regeneration cooler assembly 32 and finally to a final cooling assembly 34 through pipe 36. The unit 16 is finally moved through a pipe 38 to a receiving and separating tank 40 where the unit 16 is discharged to a filling station 42. It should be noted that each of the pipes 18, 22, 26, 30, 36 and 38 which make up the pipe circuit 17 are of a constant diameter and that each of the operative units 20, 24, 28, 32 and 34 is provided with a pipe of the same diameter.

Heat Exchangers

Figures 2, 3, 4:
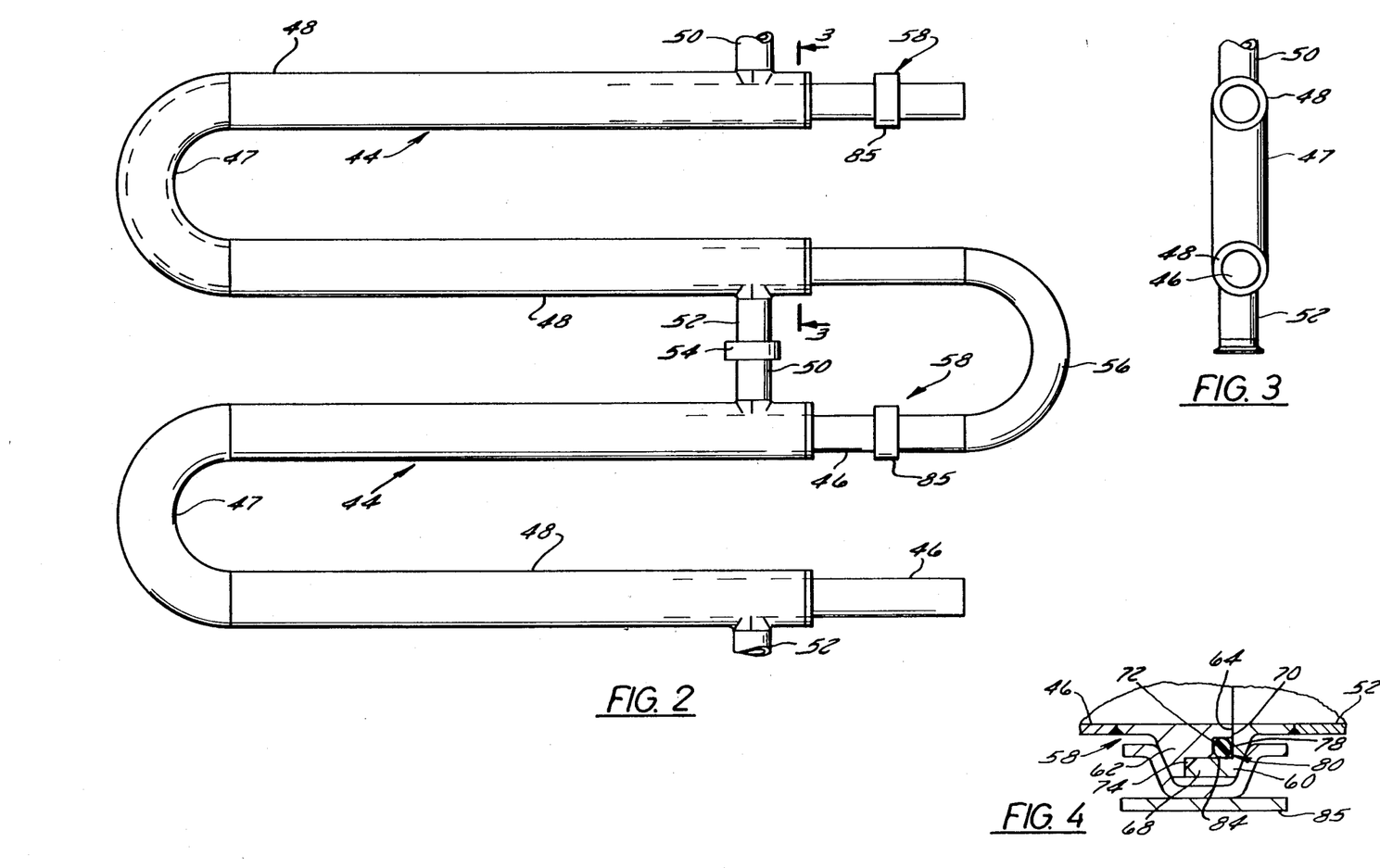
FIG. 2 is a side elevational view of the type of heat exchanger used throughout the system.
FIG. 3 is a view taken on line 3—3 of FIG. 2 showing a cross section of the heat exchanger structure.
FIG. 4 is a cross sectional view of one of the aseptic joints used throughout the system.

Referring to FIG. 2, each of the heating and cooling units 20, 24, 28, 32 and 34 are in the form of one or more "U" shaped heat exchange modules 44. Each module 44 including a tube 46 for the projectiles 122 which separate the product units 16 and an outer shell 48 having an inlet 50 and outlet 52. The tube 46 includes a 180° turn 47 within the shell 48 and is connected to the next unit by a 180° adapter 56 which is located outside of the shell 48. Each module 44 being connected to the adjacent module by means of an aseptic coupling 58 and each jacket outlet 52 connected to the adjacent inlet 50 of an adjacent module 44 by means of a coupling 54.

In this regard, each of the aseptic couplings 58, as shown in FIG. 4, is of the type shown and described in my co-pending application Ser. No. 108,472 filed Oct. 14, 1987, and entitled "Aseptic Pipe Joint". Each coupling 58 includes a ferrule 62 which is mounted on the end of tube 46 and a ferrule 60 which is mounted on the end of the 180° adapter turn 56. The ferrule 60 including an end surface 64 having a projection 68. The ferrule 62 having an end or facing surface 70 and a step 72 forming a facing surface 78. The internal diameter of each of the ferrules, 60 and 62, being identical to provide a smooth surface in the pipe for projectiles 122. The ferrules are sealed by means of an aseptic seal 80 which is positioned in the step 72 located between the surfaces 64 and the surface 78 on the ferrule 60. It should be noted that the surface 70 on ferrule 62 is designed to matingly engage with the surface 64 of the ferrule 60 to provide a continuous surface on the inside diameter of each of the ferrules. The ferrules 60 and 62 are closed by means of a V-clamping ring 85 which cams the ferrules in tight engagement.

Regenerating Heating System

Referring to FIG. 1, the regenerator heaters 20 and regenerator coolers 32 are connected to use the waste heat of the regenerator coolers 32 to preliminarily heat the product units 16 as they pass through the regenerator heaters 20. This is accomplished by means of pump 90 which is connected to the inlet of heaters 20 by a tube 92 and to the outlet of the coolers 32 by a tube 94. The inlet to the coolers 32 being connected to the outlet of the heaters 20 by means of a tube 96. The water circulated through this loop by the pump 90 carries the heat from the cooked units 16 passing through coolers 32 to the heater 20 to initially heat the incoming units 16. A thermometer 98 and stand pipe 100 can be provided in the line 92 as needed.

A hermetic hot water heating loop 102 is provided for the high temperature heaters 24. The heating loop includes a pump 104 which is connected to the inlet of heat exchanger 106 by a tube 110 and to the outlet of heater 24 by a tube 108. The heater 106 is supplied with steam from a source 112 by a line 114 connected to the inlet of heat exchanger 106.

Cooling water from a source 116 is circulated to the coolers 36 through a tube 115 and discharged from the coolers 34 through a pipe 118, back to the cooling water source 116.

Product Liquid Supply Circuit

Product liquid is stored in a tank 200 and is supplied to the product liquid-solid combining assembly 14 by means of a supply pipe 208 which is connected to the assembly 14 by means of pipes 138 and 140 through a first ball valve 142 and a second ball valve 144. respectively. Fluid pressure is maintained in the supply pipe 208 by means of pumps 218 and 220. In normal operation, a supply pressure of approximately 150 psi is maintained in the system.

Pipe Line Projectiles

Figure 5:
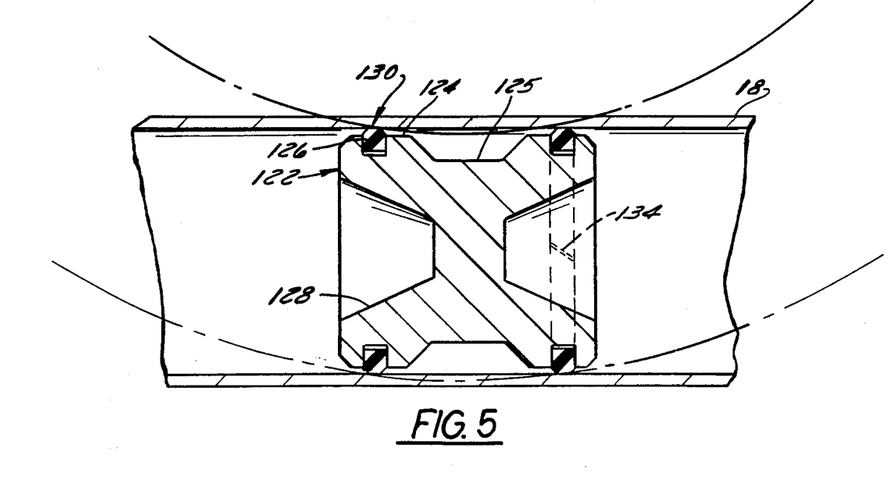
FIG. 5 is a cross sectional view of the projectile used to move the fluid through the system.

It should be noted that it is essential to the success of the system to isolate predetermined amounts or units 16 of product liquid and product solid in the pipe circuit 17. This is accomplished by means of the projectiles or plugs 122 as shown in FIG. 5. The projectile includes a cylindrical body 124 having a diameter approaching the chamber of the pipes in the pipe circuit 17. An annular groove 126 is provided at each end of the cylinder and a central groove 125 is provided in the center of the cylindrical body 124. A conical recess 128 is provided at each end of the body 124. Means are provided in each of the grooves 126 to seal the cylindrical body 124 to the inside surface of the pipe. Such means is in the form of seal rings 130 which have a diameter slightly larger than the diameter of the pipe circuit 17. Each ring 130 is provided with a diagonal cut or slot 134 to allow the ring 130 to be squeezed slightly and have sufficient resiliency to maintain engagement with the inside surface of the pipe circuit 17. The diagonal cuts 134 providing sufficient room for compression of the rings to accommodate any small variations in the diameter of the pipes in the line.

In order to achieve uniformity in the units 16, the projectiles 122 must be inserted into the line at equally spaced intervals so that the projectiles 122 form dividers for the units 16. It should be noted that the seal rings 130 on the projectiles 122 will also wipe the inside surface of the pipes to maintain a clean surface within the pipes. The projectiles 122 are inserted into the pipe 18 by means of a feed assembly 160 as described hereinafter.

Liquid-Solid Combining Assembly

The product liquid and solid particulate combining assembly 14 as shown in FIG. 1B includes three solid particulate feed assemblies 146. Each feed assembly 146 including a hydraulic lock chamber 148. In this regard and referring to FIG. 1B, each of the feed assemblies 146 shown includes a feed tube 152 having two ball valves 154 and 156. The portion of the tube 152 between ball valves 154 and 156 defines the hydraulic lock chamber 148. Predetermined amounts of solid particulate is fed into a funnel 150 in the upper end of tube 152 for storage. Valve 156 is opened to allow the solid particulate to flow into the hydraulic lock chamber 148 and the ball valve 156 is closed. The portion of the tube 152 above valve 156 is immediately refilled with solid particulate. The level of fluid in tube 152 is maintained at a preset level by means of a fluid line 158 as described hereinafter. The solid particulate is deposited into the flow line 18 by opening valve 154 in timed sequence with the movement of the projectiles 122 through pipe line 18. As soon as valve 154 is closed, valve 156 is opened to refill the lock chamber 148. Valve 156 in then closed.

In operation, the chamber 148 is initially filled with solid particulate. When the system calls for the addition of particulate to the pipe line 18, the bottom valve 154 is opened to allow the solid particulate to flow into the line 18. Process liquid is prevented from flowing through chamber 148 by valve 156. When valve 154 closes, valve 156 is opened to refill the hydraulic lock chamber 148 with solid particulate. When valve 156 is closed, a predetermined amount of solid particulate is dropped into the funnel 150 to fill the upper portion of tube 152.

Figure 7:
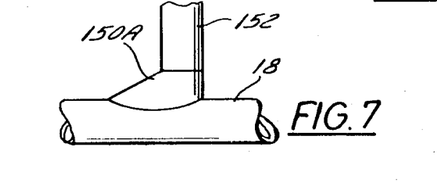
FIG. 7 is a view of the solid introduction adapter.

Referring to FIG. 7, an alternate type adaptor 150A is shown connected between tube 152 and pipe line 18. The adaptor 150A has an elliptical configuration to provide a larger opening for the particulate to enter line 18.

Product Solid Preheating Assembly

Figure 9:
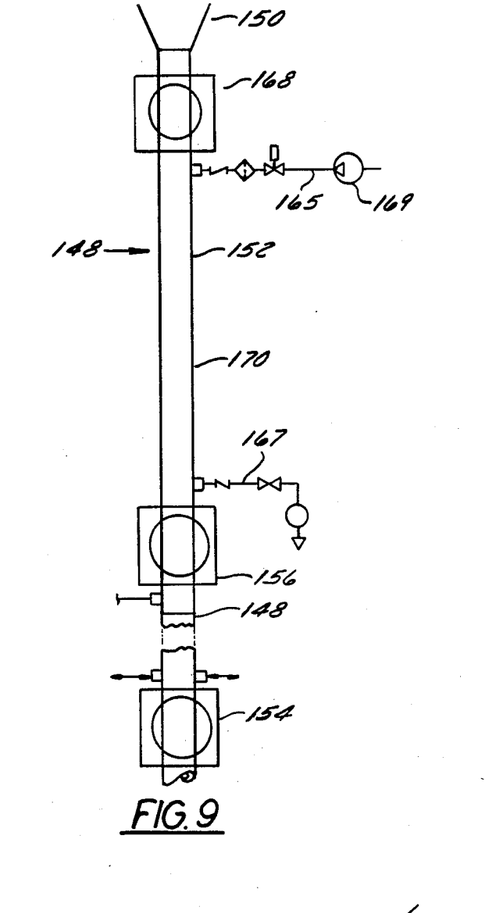
FIG. 9 is a view of one type of particulate preheating system.

The product solid particulates can be preheated or cooked by means of the assembly shown in FIG. 9 wherein each feed tube 152 is extended to include a third ball valve 168 between ball valve 156 and the funnel 150 which forms a steam lock chamber 170. Steam from a source 169 is admitted to the steam lock chamber 170 through a pipe line 165. Means are provided for the continuous removal of steam condensate in the form of a water line 167.

Figure 10:
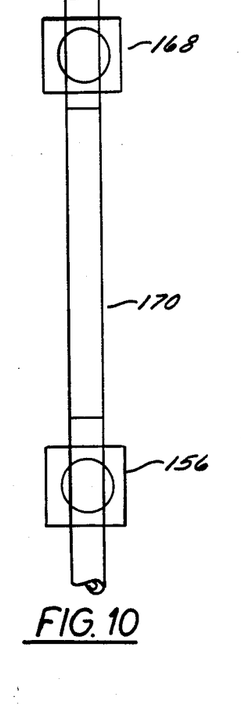
FIG. 10 is a view of an alternate type of particulate preheating system.

In FIG. 10 an alternate embodiment is shown wherein the chamber 170 is used as an infrared chamber for infrared precooking of the solid particulate. In each embodiment, the ball valves function in the same cycle as described above.

Projectile Feed Assembly

Figure 6:
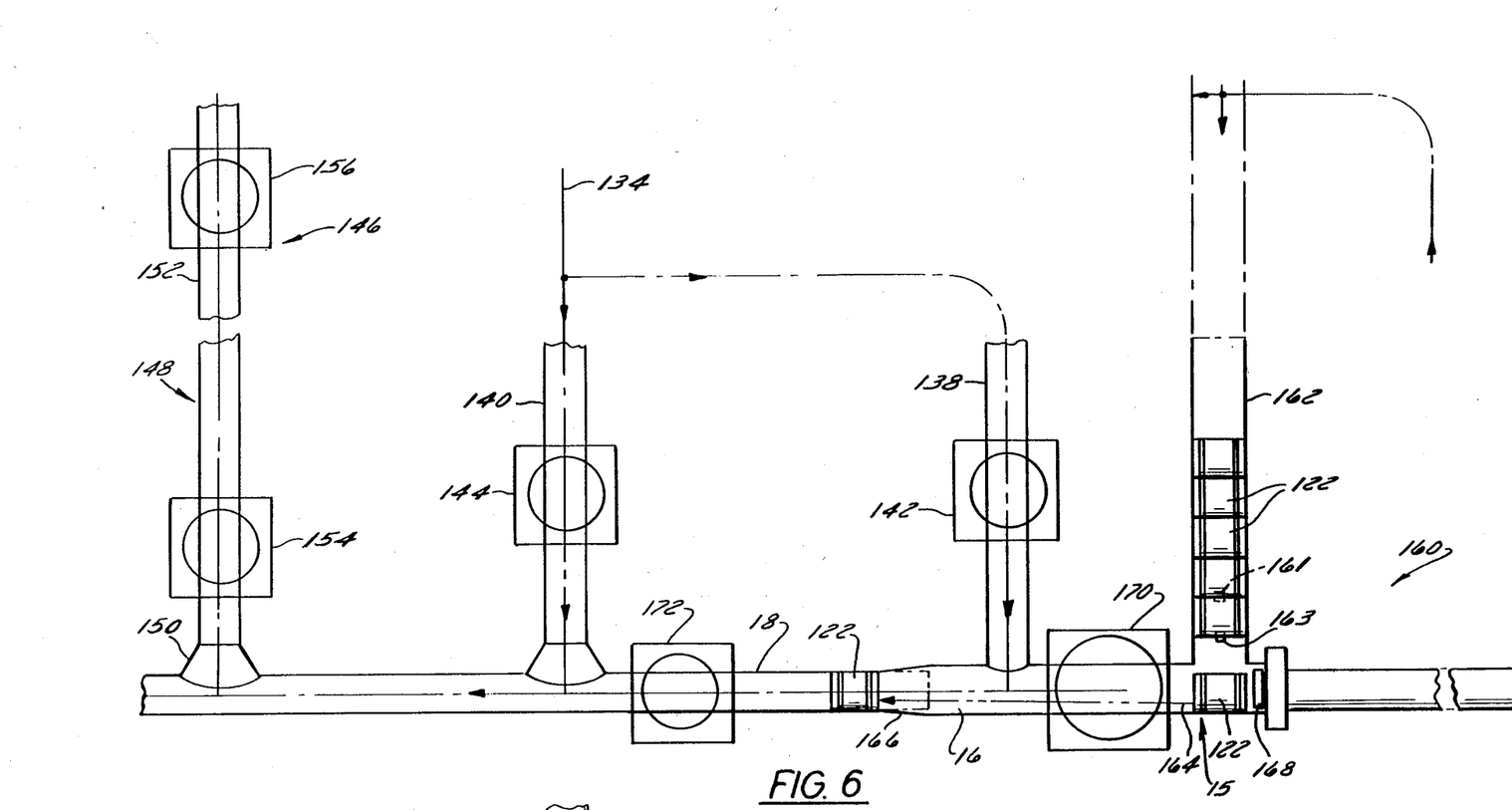
FIG. 6 is a schematic view of the solid particulate and projectile loading assembly.

The projectiles 122 are fed to the pipe 18 by means of a feed assembly 160 as shown in FIG. 6. The projectiles 122 are stored in a feed tube 162 which is connected to a load pipe 164. The load pipe 164 is connected to the pipe 18 by means of a pipe reducer 166 having a diameter equal to the diameter of the pipe circuit. The projectiles 122 are supported in the feed line by a pair of fingers 161 and 163. A projectile 122 is dropped into the load pipe 164 from the feed tube 162 by retracting the lower finger 163 to allow the bottom projectile 122 to drop from the feed tube 162. The finger 163 is returned to the support position and the upper finger 161 is retracted to allow the projectiles 122 to drop down onto finger 163. The projectile 122 in load pipe 164 is pushed by means of a piston 168 through a third ball valve 170 into the reducer 166 at the end of the load pipe 164. The first product liquid supply line 138 is connected to the load pipe 164 between the ball valve 170 and the reducer 166. After the projectile or plug 122 is pushed into the reducer 166, the piston 168 is withdrawn and the ball valve 170 closed. A fourth ball valve 172 is opened and the first ball valve 142 in the feed line 138 is opened to allow product liquid to flow into the load pipe 164 to force the projectile 122 through the reducer 166 and the fourth ball valve 172 far enough to pass the second process liquid supply line 140. The ball valves 142 and 172 are closed and the second ball valve 144 opened to allow product liquid to continue to push the projectile 122 past the solid particulate feed assemblies 146.

In this regard and referring to FIG. 6, the product liquid-solid units 16 are formed as a projectile 122 passes the solid particulate feed assemblies 146. It should be noted that as the projectile 122 is moved past each of the feed assemblies 146, a second projectile is being fed into the load lie 164. As the projectile clears each of the feed assemblies A, B and C, the lower ball valve 154 in each of the assemblies A, B and C is opened allowing the solid particulate to flow into the product liquid in the pipe 18. At the same time, the second ball valve 144 is closed and the first valve 142 and fourth valve 172 are opened to move the next projectile 122 through the ball valve 172 into the pipe 18 to isolate the unit 16 between the projectiles 122.

Projectile Receiving and Separation Assembly

Figure 8:
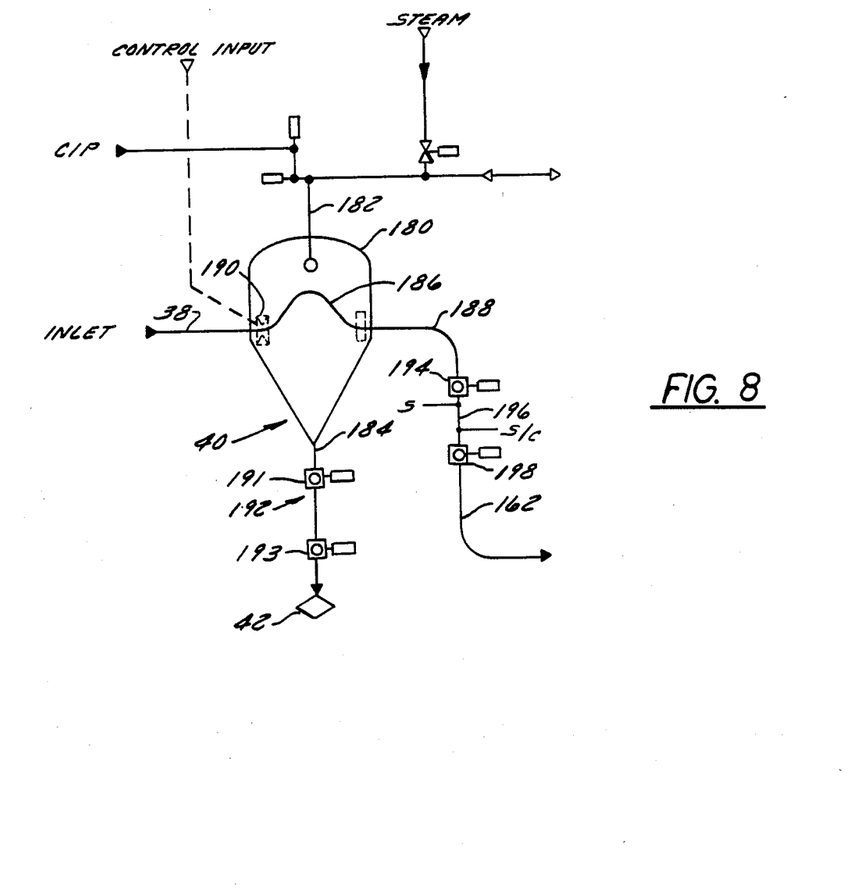
FIG. 8 is a schematic flow diagram of the aseptic projectile separation system.

The projectile receiving and separation assembly 40 is shown in FIG. 8. The assembly generally includes a tank 180 having a steam inlet 182 at the top and a product outlet 184 at the bottom. The end of product pipe 38 is connected to one side of a curved rack 186 located in tank 180. The other end of rack 186 is connected to a return pipe 188 that is connected to the inlet of the projectile feed tube 162. The product liquid and solid is separated from the projectiles 122 on entering the tank 180. An input control means 190 is provided at the entrance to rack 186. The rack 186 is open at the top and bottom to allow the product liquid and solid to flow to the outlet 184 at the bottom of the tank 180 for discharge into an hydraulic lock chamber 192 formed between ball valves 191 and 193.

The projectiles 122 are pushed along the curved rack 186 by the projectiles that follow until the projectiles pass over the highpoint of the curved rack 186. The projectiles then slide down the return pipe 188 through a ball valve 194 into a hydraulic lock chamber 196.

Valve 194 is closed and ball valve 198 is opened allowing the projectile 122 to pass into the funnel type guide tube 199 at the top of feed line 162.

Means are also provided for maintaining a constant liquid level in the feed tubes 152 and the projectile feed line 162. Such means is in the form of a pump 222 connected to the tank 200 by a fluid tube 224 and to the feed tubes 152 and feed line 162 by a fluid tube 226.

Thus it is apparent that there has been provided, in accordance with the invention, a liquid-solid continuous asceptic processing system that fully satisfies the aims and advantages set forth above. While the invention has been described in conjunction with specific embodiments thereof, it is evident that many alternatives, modifications and variations will be apparent to those skilled in the art. Accordingly, it is intended to embrace all such alternatives, modifications and variations as fall within the spirit and broad scope of the appended claims.

The embodiments of the invention in which an exclusive property or privilege is claimed are defined as follows:

1. A liquid-solid continuous aseptic processing system comprising:
    a closed pipe circuit having a constant diameter;
    means for introducing projectiles into said pipe circuit at equally spaced intervals;
    means for introducing a process liquid under pressure into said pipe circuit in the spaces between said projectiles to move said projectiles through said pipe circuit;
    means for introducing predetermined amounts of product solid particulates into the process liquid in the spaces between said projectiles;
    means for processing the liquid-solid particulate units as the projectiles move through the pipe circuit, and means for separating said liquid-solid particulate units from said projectile whereby predetermined amounts of process liquid and solid are processed simultaneously.

2. The system according to claim 1 wherein said projectile introducing means includes:
    a holding tube for said projectiles;
    means for dropping said projectiles one at a time into said holding tube; and
    a piston and cylinder assembly for pushing said projectiles from said holding tube into said pipe circuit one at a time.

3. The system according to claim 2 wherein each projectile includes a cylindrical body having an annular groove at each end and a seal ring in each groove for sealingly engaging the interior surface of said pipe circuit.

4. The system according to claim 3 wherein said liquid introducing means includes a source of product liquid and
    a pump for maintaining a predetermined pressure on said process liquid and pipe means for introducing the process liquid into said pipe circuit to move the projectiles through said circuit.

5. The system according to claim 4 wherein said solid particulate introducing means comprises one or more feed tubes connected to said pipe circuit, each feed tube including an upper and a lower ball valve, said valves being located a spaced distance apart to define a hydraulic lock chamber in said feed tube whereby said chamber is filled with a predetermined amount of solid particular on opening said upper valve and said particulate in said chamber is discharged into said pipe circuit on opening said lower valve.

6. The system according to claim 1, 2 or 3 wherein said solid particulate introducing means comprises one or more feed tubes connected to said pipe circuit, each feed tube including an upper and a lower ball valve, said valves being located a spaced distance apart to define a hydraulic lock chamber in said feed tube whereby said chamber is filled with a predetermined amount of solid particulate on opening said upper valve and said particular in said chamber is discharged into said pipe circuit on opening said lower valve.

7. The system according to claims 1, 2, 3, 4 and 5 wherein said processing means includes regenerating heat exchange assembly connected in said pipe circuit to preliminarily heat the liquid solid units and a high temperature heat exchange assembly connected in said pipe circuit for raising the temperature to the cooking temperature for the liquid solid particulate units.

8. A continuous aseptic processing assembly for processing individual units of predetermined amounts of process liquid and solid particulates said assembly comprising:
    a pipe circuit having a constant diameter;
    means for introducing process liquid into one end of said circuit at a constant pressure;
    means for separating said process liquid into units of predetermined amounts of process liquid;
    means for depositing predetermined amounts of solid particulates into each of said units;
    means in said circuit for processing said units; and
    means for discharging said processed units from said circuit for packaging.

9. The assembly according to claim 8 wherein said separating means comprises a plurality of projectiles and a projectile feed assembly operatively connected to said one end of said pipe circuit for introducing said projectiles into said circuit at predetermined intervals.

10. The assembly according to claim 9 wherein said feed assembly includes a load pipe, a pipe reducer connecting said load pipe to said circuit and a piston and cylinder assembly for pushing projectiles from said load pipe through said reducer and into said circuit.

11. The assembly according to claim 10 wherein said introducing means comprises a first pipe having a first valve connected to said load pipe and a second pipe having a second valve connected to said circuit, a third valve in said load pipe and a fourth valve in said circuit, said first valve and fourth valve being opened when a projectile is in said reducer to allow process liquid to move a projectile through said fourth valve and past said second pipe, said second and third valves being opened to allow process liquid to move said projectile in said circuit through said depositing means and to allow said piston to move a projectile through said third valve into said reducer.

12. The assembly according to claim 11 wherein said depositing means comprises one or more feed tubes connected to said circuit, each feed tube including an upper and a lower valve defining a hydraulic lock chamber in said feed tube for storing a predetermined amount of product solids particulates, said upper valve being opened to load said chamber and said lower valve being opened to deposit said solid particulates into said circuit.

13. The assembly according to claim 12 wherein said solid particulates depositing means includes means for precooking said particulate prior to entering said hydraulic lock chamber in said feed tube.

14. The assembly according to claims 8 or 10 wherein said depositing means comprises one or more feed tubes connected to said circuit, each feed tube including an upper and a lower valve defining a hydraulic lock chamber in said feed tube for storing a predetermined amounts of product solid particulates, aid upper valve being opened to load said chamber and said lower valve being opened to deposit said solid particulates into said circuit.

15. The assembly according to claim 10, 12, or 13 wherein said introducing means comprises a first pipe having a first valve connected to said load pipe and a second pipe having a second valve connected to said circuit, a third valve in said load pipe and a fourth valve in said circuit, said first and fourth valves being opened when a projectile is in said reducer to allow the processed liquid to move a projectile through said fourth valve and pass said second pipe, said second and third valves being opened to allow processed liquid to move said projectile in said circuit through said depositing means and to allow said piston to move a projectile through said third valve into said reducer.

16. The assembly according to claims 8, 9, 10, 11, 12 and 13 wherein said processing means includes a regenerating heat exchange assembly connected in said pipe circuit to preliminarily heat said liquid-solid units and a high temperature heat exchange assembly connected in said pipe circuit for raising the temperature to the cooking temperature of said liquid solid particulate units.

* * * * *